US011704371B1

(12) United States Patent
Chan et al.

(10) Patent No.: US 11,704,371 B1
(45) Date of Patent: Jul. 18, 2023

(54) USER CENTRIC TOPICS FOR TOPIC SUGGESTIONS

(71) Applicant: Microsoft Technology Licensing, LLC, Redmond, WA (US)

(72) Inventors: David Timothy Chan, Sammamish, WA (US); Dmitriy Meyerzon, Bellevue, WA (US); Sebastian Johannes Blohm, Munich (DE); Anita Rajan, Redmond, WA (US); Ravi Kumar Bikkula, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/666,287

(22) Filed: Feb. 7, 2022

(51) Int. Cl.
*G06F 16/30* (2019.01)
*G06F 16/907* (2019.01)
*G06F 16/9038* (2019.01)
*G06F 16/9035* (2019.01)
*G06F 16/903* (2019.01)
*G06F 16/00* (2019.01)

(52) U.S. Cl.
CPC ........ *G06F 16/907* (2019.01); *G06F 16/9035* (2019.01); *G06F 16/9038* (2019.01); *G06F 16/90344* (2019.01)

(58) Field of Classification Search
None
See application file for complete search history.

(56) References Cited

U.S. PATENT DOCUMENTS

| 8,892,554 | B2* | 11/2014 | Carmel | G06F 16/313 706/18 |
| 9,116,894 | B2* | 8/2015 | Chidlovskii | G06F 16/58 |
| 11,243,996 | B2* | 2/2022 | Huyghe | G06F 16/438 |

(Continued)

OTHER PUBLICATIONS

Anarfi, R., Kwapong, B. and Fletcher, K.K., Sep. 2021. Towards a reinforcement learning-based exploratory search for mashup tag recommendation. In 2021 IEEE International Conference on Smart Data Services (SMDS) (pp. 8-17). IEEE. (Year: 2021).*

(Continued)

*Primary Examiner* — Polina G Peach
(74) *Attorney, Agent, or Firm* — NovoTechIP International PLLC

(57) ABSTRACT

A data processing system implements receiving a request for user-centric topic recommendations from a computing device of a user in response to a user input in an application indicating that the user is attempting to assign a tag to a first content item in the application; obtaining a first set of user-centric topic recommendations from a first topic datastore based on a relevance ranking assigned to each of the topic recommendations; providing the first set of user-centric topic recommendations to the computing device; causing the computing device to display the first set of user-centric topic recommendations; receiving one or more second requests for user-centric topic recommendations; obtaining one or more second sets of user-centric topic recommendations from the first topic datastore based on the query string and the relevance ranking; and causing the computing device of the user to display the one or more second sets of user-centric topic recommendations.

20 Claims, 16 Drawing Sheets

(56) References Cited

U.S. PATENT DOCUMENTS

| | | | |
|---|---|---|---|
| 11,328,004 B2* | 5/2022 | Lorrain-Hale | G06F 16/907 |
| 11,556,714 B2* | 1/2023 | Marmon | G06F 16/9535 |
| 2006/0190436 A1* | 8/2006 | Richardson | G06F 16/3322 |
| 2007/0028171 A1* | 2/2007 | MacLaurin | G06F 16/7867 |
| | | | 715/825 |
| 2011/0246459 A1* | 10/2011 | Rinearson | G06F 16/907 |
| | | | 707/E17.014 |
| 2013/0159323 A1 | 6/2013 | Hua et al. | |
| 2015/0046418 A1* | 2/2015 | Akbacak | G06F 16/907 |
| | | | 707/706 |
| 2016/0103875 A1* | 4/2016 | Zupancic | G06F 40/253 |
| | | | 707/773 |
| 2016/0269334 A1* | 9/2016 | DeSouza Sana | H04L 51/18 |
| 2017/0046440 A1* | 2/2017 | Miyazaki | H04L 67/01 |
| 2017/0308613 A1* | 10/2017 | Zhu | G06F 16/9535 |
| 2017/0351778 A1* | 12/2017 | Sperling | G06F 16/38 |
| 2018/0095998 A1* | 4/2018 | Barak | G06F 16/5866 |
| 2018/0108093 A1* | 4/2018 | Podgorny | G06N 7/01 |
| 2018/0129389 A1* | 5/2018 | Sun | G06F 3/0484 |
| 2018/0129664 A1* | 5/2018 | Ning | G06F 16/24578 |
| 2019/0073412 A1* | 3/2019 | Ranganathan | G06F 16/9035 |
| 2020/0036783 A1* | 1/2020 | Bourassa | G06F 16/90335 |
| 2020/0110839 A1* | 4/2020 | Wang | G06F 16/335 |
| 2020/0380212 A1* | 12/2020 | Butler | G06F 16/211 |
| 2021/0176191 A1* | 6/2021 | Pargaonkar | H04L 61/30 |
| 2022/0092119 A1* | 3/2022 | Devenny | G06Q 10/109 |
| 2022/0303339 A1* | 9/2022 | Laughton | G06F 18/214 |
| 2022/0391454 A1* | 12/2022 | Bhalerao | G06F 16/907 |

OTHER PUBLICATIONS

"International Search Report and Written Opinion Issued in PCT Application No. PCT/US22/050814", dated Mar. 7, 2023, 14 Pages.

* cited by examiner

Project X Planning Group

Members of the Project X Planning Group may share content, collaborate on content, discuss various aspects of the project with other members of the planning group.

Messages
You may post messages to members of the planning group. You may also add tags to your post to indicate.

Let's set up a follow up meeting to address the action items that were identified in the development meeting on Friday.

Enter one or more tags here.

Cancel     Post Message

Project Files
Files shared by the members of the group are accessible below. You may add new files to the project that are accessible to other members of the project group.

- Monthlyplanningmeeting.pptx
- Functional Requirements v3.2.docx
- UI Layout v2.0.docx

FIG. 5A

Project X Planning Group

Members of the Project X Planning Group may share content, collaborate on content, discuss various aspects of the project with other members of the planning group.

Messages
You may post messages to members of the planning group. You may also add tags to your post to indicate.

Let's set up a follow up meeting to address the action items that were identified in the development meeting on Friday.

\#

| Cancel | Post Message |

Topic Selection:
- Aardvark Coding Environment
- Accessible User Interfaces
- Accessing Data
- Availability Requirements
- Azimuth below. You may add new of the project group.

Project Fi
Files share
files to the
- Mo
- Functional Requirements v3.2.docx
- UI Layout v2.0.docx

FIG. 5B

Project X Planning Group

Members of the Project X Planning Group may share content, collaborate on content, discuss various aspects of the project with other members of the planning group.

Messages
You may post messages to members of the planning group. You may also add tags to your post to indicate.

Let's set up a follow up meeting to address the action items that were identified in the development meeting on Friday.

Enter one or more tags here.

Cancel    Post Message

Project Files
Files shared by the members of the group are accessible below. You may add new files to the project that are accessible to other members of the project group.

📁 Monthlyplanningmeeting.pptx

📁 Functional Requirements v3.2.docx

📁 UI Layout v2.0.docx

USER CENTRIC TOPICS FOR TOPIC SUGGESTIONS

BACKGROUND

Many organizations, such as but not limited to corporations, educational institutions, and governmental entities, may create, maintain, and share large repositories of electronic documents, messages, and/or other types of content. Identifying content that is relevant to a particular user can be challenging. To help remedy this problem, users may associate tags with electronic content items that identify topics related to the electronic content items. These tags may be used to search for relevant content and/or to provide content recommendations to users.

An organization may have a very large number of users that are each defining their own tags used to associate topics with content. Furthermore, additional topics may be automatically generated by analyzing the content in the repositories using machine learning models configured to identify a topic of electronic content items. Consequently, when a user attempts to identify a relevant topic for tagging content, the user may be presented with an overwhelming number of topics and the user may have a difficult time identifying which tags may be relevant to their particular needs. Suggesting relevant topics is particularly difficult when the user has provided no query input or a very short query int (e.g., only a few characters) to narrow down the topics to be suggested to the user. Hence, there is a need for improved systems and methods for providing user centric topics for topic suggestions.

SUMMARY

An example data processing system according to the disclosure may include a processor and a machine-readable medium storing executable instructions. The instructions when executed cause the processor to perform operations including receiving a request for user-centric topic recommendations from a computing device of a user in response to a user input in an application indicating that the user is attempting to assign a tag to a first content item in the application, the request indicating a requested number of topic recommendations, the tag representing a topic of the first content item; obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models; providing the first set of user-centric topic recommendations to the computing device of the user; correlating the first set of user-centric topics with a set of organization-wide topics of an organization with which the user is associated; discarding any topics from the first set of user-centric topic which are not present in the set of organization-wide topics; causing the computing device of the user to display the first set of user-centric topic recommendations; receiving one or more second requests for user-centric topic recommendations from the computing device of the user, each of the one or more second requests comprising a query string, the query string being incrementally updated in each of the one or more second requests; obtaining one or more second sets of user-centric topic recommendations from the first topic datastore based on the query string and the relevance ranking, the one or more second sets of user-centric topic recommendations further refining the user-centric topic recommendations; providing the one or more second sets of user-centric topic recommendations to the computing device of the user; and causing the computing device of the user to dynamically display the one or more second sets of user-centric topic recommendations.

An example method implemented in a data processing system for providing user-centric topic recommendations includes receive a request for the user-centric topic recommendations from a computing device of a user in response to a user input in an application indicating that the user is attempting to assign a tag to a first content item in the application, the request indicating a requested number of topic recommendations, the tag representing a topic of the first content item; obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models; correlating the first set of user-centric topics with a set of organization-wide topics of an organization with which the user is associated; discarding any topics from the first set of user-centric topic which are not present in the set of organization-wide topics; providing the first set of user-centric topic recommendations to the computing device of the user; causing the computing device of the user to display the first set of user-centric topic recommendations; receiving one or more second requests for user-centric topic recommendations from the computing device of the user, each of the one or more second requests comprising a query string, the query string being incrementally updated in each of the one or more second requests; obtaining one or more second sets of user-centric topic recommendations from the first topic datastore based on the query string and the relevance ranking, the one or more second sets of user-centric topic recommendations further refining the user-centric topic recommendations; providing the one or more second sets of user-centric topic recommendations to the computing device of the user; and causing the computing device of the user to dynamically display the one or more second sets of user-centric topic recommendations.

An example machine-readable medium on which are stored instructions. The instructions when executed cause a processor of a programmable device to perform operations of receiving a request for user-centric topic recommendations from a computing device of a user in response to a user input in an application indicating that the user is attempting to assign a tag to a first content item in the application, the request indicating a requested number of topic recommendations, the tag representing a topic of the first content item; obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models; correlating the first set of user-centric topics with a set of organization-wide topics of an organization with which the user is associated; discarding any topics from the first set of user-centric topic which are not present in the set of organization-wide topics; providing the first set of user-centric topic recommendations to the computing device of the user; causing the computing device of the user to display the first set of user-centric topic recommendations; receiving one or more second requests for user-centric topic recommendations from the computing device of the user, each of the one or more second requests comprising a query string, the query string being incrementally updated in each of the one or more second requests; obtaining one or more second sets of user-centric topic recommendations from the first topic datastore based on the query string and the relevance ranking, the one or more second sets of user-centric topic recommendations further refining the user-centric topic recommendations; providing the one or more second sets of user-centric topic recommendations to the computing device of the user; and causing the computing device of the user to dynamically display the one or more second sets of user-centric topic recommendations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C, 5D, and 5E is a diagram showing an example graphical user interface of an application in which the user selects a topic using current techniques.

FIGS. 6A, 6B, 6C, and 6D is a diagram showing an example graphical user interface of an application in which the user selects a topic using the user-centric topic techniques provided herein to provide more relevant topics to the user.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing user-centric topic recommendations are provided. These techniques provide a technical solution to the problem of determining which topics are relevant for a particular user. The user-centric topic recommendations may be determined by analyzing various content sources associated with the user to extract key phrases, such as but not limited to email, text messages, documents associated with the user, groups or departments associated with the user, and/or other content sources. These key phrases may be categorized to identify topics relevant to the user. The user-centric topics may be correlated with an organization-wide set of topics to provide topic recommendations that are not only relevant to the user but also to an organization with which the user is associated. A technical benefit of this approach is that it makes more efficient use of computing resources by reducing the computing resources consumed by users searching for and accessing relevant topic information. These and other technical benefits of the techniques disclosed herein will be evident from the discussion of the example implementations that follow.

Figure 1:
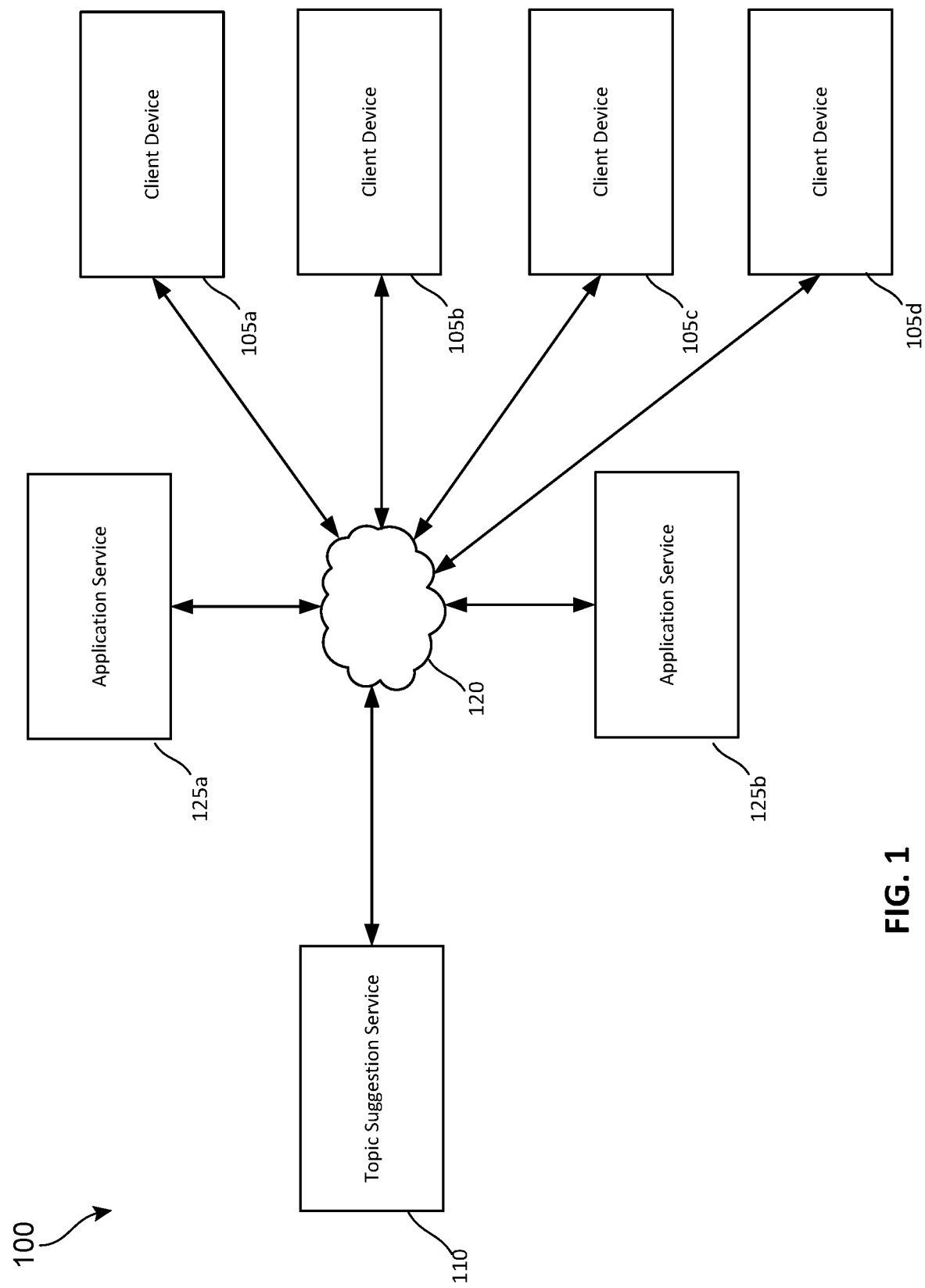
FIG. 1 is a diagram showing an example computing environment in which the techniques disclosed herein for providing user-centric topics may be implemented.

FIG. 1 is a diagram showing an example computing environment 100 in which the techniques disclosed herein for providing user-centric topic recommendations may be implemented. The computing environment 100 may include a topic suggestion service 110 and an application services 125a and 125b. The example computing environment may also include a plurality of client devices, such as client devices 105a, 105b, 105c, and 105d. The client devices 105a, 105b, 105c, and 105d, the application services 125a and 125b, and the topic suggestion service 110 may communicate via the network 120. Additional details of the topic suggestion service 110, the application services 125a and 125b, and client devices 105a, 105b, 105c, and 105d are discussed in the example which follow.

The topic suggestion service 110 may be implemented as a cloud-based service or set of services. The topic suggestion service 110 may be configured to provide user-centric topic recommendations that may be associated with electronic content items created or modified using the application services 125a and 125b. The topic suggestion service 110 may include means for identifying user centric topic items and means for providing the user centric topic to a user searching for a topic or topics to associate with an electronic content item that the user is creating or modifying using the application services 125a and 125b. Additional details of these features are described with respect to FIG. 2.

The application services 125a and 125b may provide one or more cloud-based or network-based services for the computing devices 105a-105d. The application services 125a and 125b may provide a word processing application, a presentation application, project management software, a communications platform, a collaboration platform, a content sharing platform, a content creation platform, social messaging platform, and/or other services that are accessible to users via the computing devices 105a-105d and allow the users to communicate and/or consume, create, share, collaborate on, and/or modify content. Other types of services may be provided by the application services 125a and 125b in addition to or instead of these services. The services provided by the application services 125a and 125b may be accessed via a native application on a computing device, via a native application configured to communicate with the application services 125a and 125b, via other means, or via a combination thereof.

The application services 125a and 125b may also be configured to allow users of the client devices 105a-105d to obtain topic recommendations from the topic suggestion service 110 and to associate one or more topics with content being created and/or modified using the application services 125a and 125b. The examples which follow describe how the topic suggestion service 110 may create user centric topics for users and provide these recommendations to the users in the application services 125a and 125b.

The client devices 105a, 105b, 105c, and 105d are computing devices that may be implemented as a portable electronic device, such as a mobile phone, a tablet computer, a laptop computer, a portable digital assistant device, a portable game console, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices. Furthermore, the topic suggestion service 110 is shown as being implemented as a separate service from the application services 125a and 125b. However, the topic suggestion service 110 may be implemented as part of the same cloud-based set of services as one or more of the application services 125a and 125b.

Figure 2:
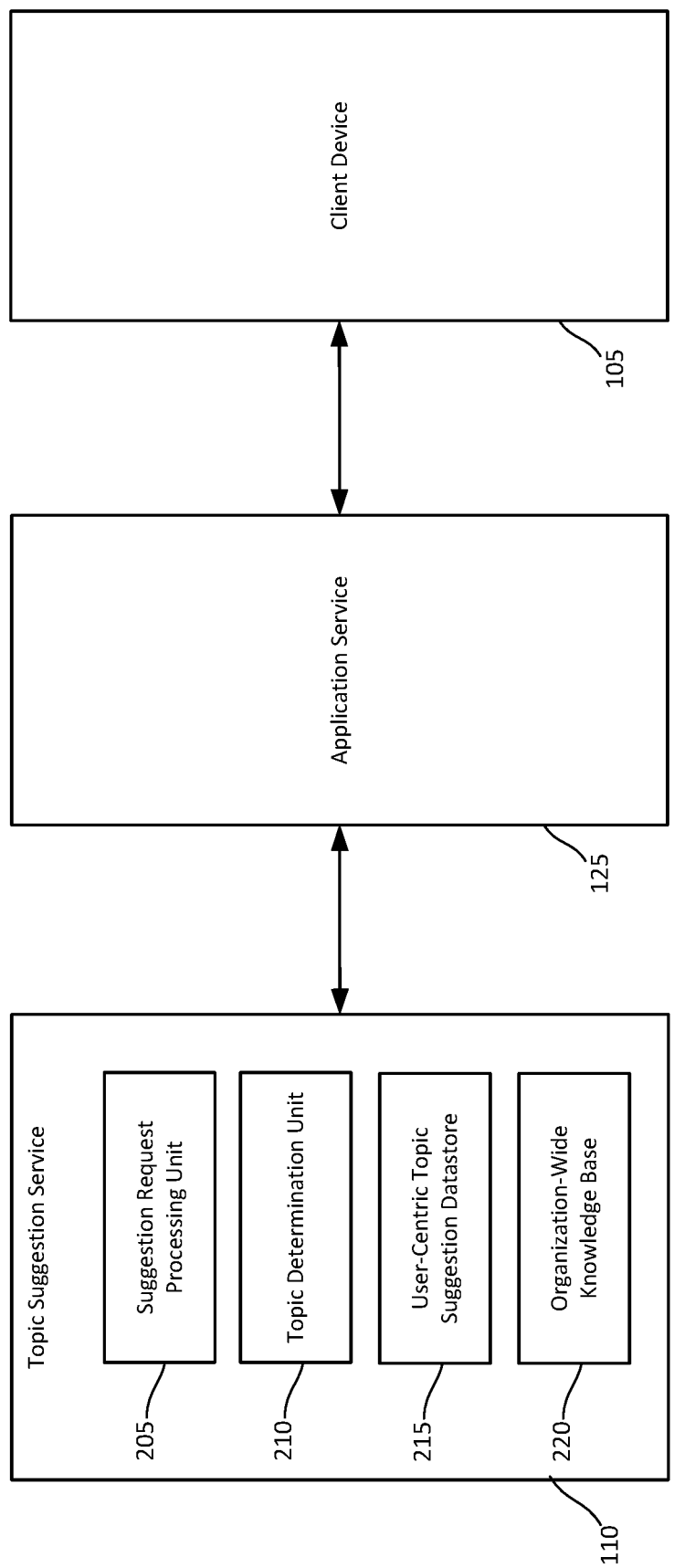
FIG. 2 is a diagram showing additional details of the topic suggestion service shown in FIG. 1.

FIG. 2 is a diagram showing additional details of the topic suggestion service 110 shown in FIG. 1. The topic suggestion service 110 may include a suggestion request processing unit 205, a topic determination unit 210, a topic suggestion datastore 215, and an organization-wide knowledge base 220. The suggestion request processing unit 205 may be configured to receive requests from an application service, such as the application services 125a and 125b, and/or from a client device 105, such as the client devices 105a-105d. The request may include a user input that may be used to formulate queries for topic recommendations that may be presented to the user. Examples how the query may be formulated are provided in the examples which follow. The topic determination unit 210 may be configured to determine a plurality of user-centric topic recommendations that may be presented to the user. The user-centric topic recommendations may be determined by analyzing various content sources, such as but not limited to email messages, calendar entries, communication session messages, documents, meeting transcripts, and/or other content created, modified, and/or consumed by the user.

The organization-wide knowledge base 220 and the user-centric topic suggestion datastore 215 may be used to store topic information. The organization-wide knowledge base 220 is a persistent datastore that may be used to store topic information and other information for the organization. The topic information for the organization may be derived from content associated with multiple users across the organization. The organization-wide topic information may be derived from content sources, such as but not limited to email messages, calendar entries, communication session messages, documents, meeting transcripts, and/or other content created, modified, and/or consumed by users associated with the organization. The organization-wide knowledge base 220 may be populated with topic data by analyzing content associated with the organization using one or more machine learning models and/or rules-based models configured to identify key phrases in the content and to identify one or more topics associated with the key phrases.

The user-centric topic suggestion datastore 215 may be a persistent datastore which may be used to store topic suggestion information. The topic suggestion information may be output by the topic determination unit 210 and may be derived from the topic information included in the organization-wide knowledge base 220. The user centric topic information may be a subset of the topics included in the organization-wide knowledge base 220 that have been determined to be relevant to a particular user. The information for each user may be stored in a user-specific shard or partition of the user-centric topic suggestion datastore 215. The suggestion request processing unit 205 may be configured to access the topic suggestion information stored in the user-centric topic suggestion datastore 215 to obtain topic recommendations that may be presented to users in response to a topic suggestion request. The determination of user centric topics to include in user centric topic suggestions is discussed in detail in the examples which follow.

Figure 3:
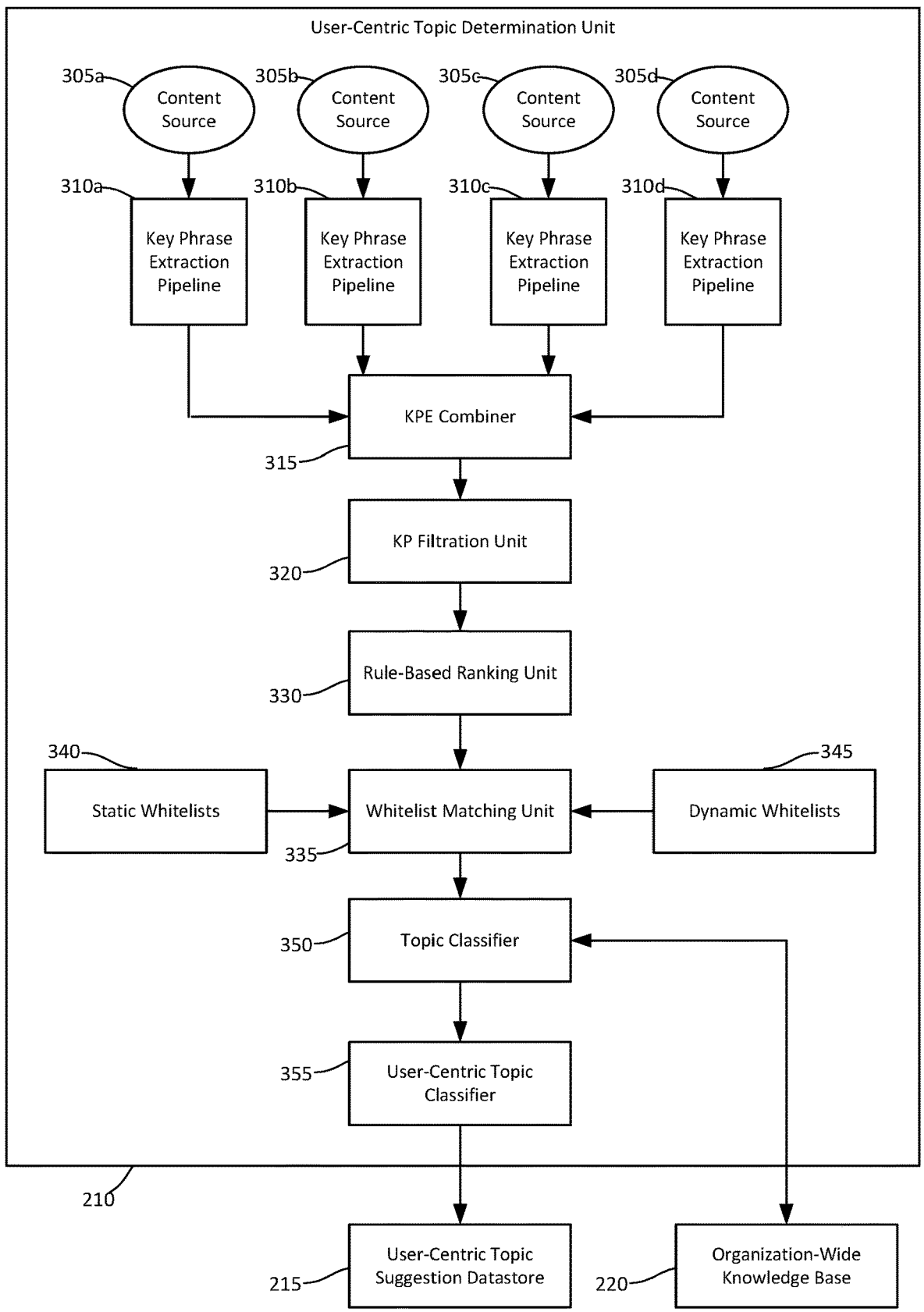
FIG. 3 is a diagram showing additional details of the user centric topic determination unit of the topic suggestion service shown in FIG. 2.

FIG. 3 is a diagram showing an example implementation of the topic determination unit 210. The topic determination unit 210 may be configured to analyze various types of content and information associated with a user to provide user-centric topic recommendations. The topic determination unit 210 may also provide organization-wide topic recommendations. The content may be stored in one or more repositories of information associated with the users and/or with an organization which the users are associated. The repositories may be stored on a server or servers associated with the application service 125a and/or 125b.

In the example shown in FIG. 3, the topic determination unit 210 is configured to obtain content from four different content sources 305a, 305b, 305c, and 305d. These content source may include documents, emails, calendar entries, text messages, documents, meeting transcripts, information identifying groups and/or teams to which the users is a member, and/or other information sources associated with the organization with which the user is associated. The example shown in FIG. 3 only includes four content sources, but other implementations may include a different number of content sources. The content sources may be stored in one or more persistent information repositories associated with the organization, and the topic determination unit 210 may be configured to periodically query the content sources to analyze the content associated with each of the content sources to update the user-centric topic recommendations. In some implementations, the content sources may include content for more than one user, and the topic determination unit 210 may generate user-centric topic recommendations for each of the users. In other implementations, the content obtained from the content sources 305a, 305b, 305c, and 305d may include information for a particular user, and the topic determination unit 210 may obtain content for the user from the content sources 305a, 305b, 305c, and 305d.

Each of the content sources may be analyzed by a key phrase extraction pipeline 310. Each of the content sources 305*a*-305*d* have an associated key phrase extraction pipeline 310*a*-310*d*. The key phrase extraction pipeline 310 may include one or more first models configured to extract key phrases from a particular content source 305. The models may be implemented by machine learning and/or rules-based models configured to analyze electronic content and to extract key phrases from the electronic content. The electronic content may include textual content, and the one or more models may be configured to classify portions of the textual content as being related to a particular topic. The models may be trained using data from the organization to identify key phrases that appear regularly in the content for the organization, and the models may then be used to identify the key phrases most relevant to the users by identifying the key phrases included in the users' content. Each key phrase extraction pipeline may be configured to analyzing a particular type of content and extract the key phrases from this content.

The key phrase extraction pipeline 310 may also include one or more filters to improve the key phrase information generated by the key phrase extraction pipeline 310. The key phrase extraction pipeline 310 may be configured to perform pre-processing filtering on the input provided to the models and may also be configured to perform post-processing filtering on the output obtained from the models. The pre-processing filtering may be used to filter out portions of content items that may be irrelevant to the key phrase extraction. For example, a content item may include standard headers and/or labels, boilerplate text, and/or other information that is not indicative of key phrase usage by the user. Such textual content may be filtered out by the pre-processing filtering before the content is provided to the one or more models for extraction of key phrases. The post-processing filtering may be used to filter the output of the one or more models to remove key phrase predictions output by the one or more models that are associated with a low confidence score. The one or more models may associate a confidence score with a prediction that indicates how the likely the prediction is to be a key phrase. The post-processing filtering may filter out predictions for which the confidence score does not satisfy a minimum threshold.

The key phrase extraction combiner 315 may be configured to receive the key phrases extracted from the user content by each of the key phrase extraction pipelines 310*a*-310*d* and to combines the received key phrase information. The key phrase information may be combined into a list, a tree, or other data structure that may be used for subsequent storage and/or processing of the key phrase information. The combined key phrase information may be provided to a key phrase filter unit 320. The key phrase filter unit 320 may be included in addition to or instead of the post-processing filtering which may be provided by the key phrase extraction pipeline 310.

The rule-based ranking unit 330 may be configured to rank the key phrases included in the combined key phrase information obtained from the key phrase extraction combiner 315. The rule-based ranking unit 330 may be configured to rank the key phrases based on various features defined by the rules. The rank may be used to determine which key phrases to recommend to a user as a user-centric topic recommendation. Higher ranked key phrases may be presented to the user as topic recommendations before lower ranked key phrases are presented to the user.

The rule-based ranking unit 330 may utilize multiple rules to assign a score to the key phrases. Some rules may analyze the frequency that a key phrase is detected in content associated with the user. For example, some rules may determine how frequently the key phrase appears in emails, text messages, documents, calendar appointments, meeting transcripts, and/or other documents created by, viewed, and/or modified by the user. Some rules may determine whether the key phase is present in a particular portion of the document. For example, a first rule associated with an email may determine a frequency that a key phrase appears in the subject line of the email, and a second rule associated with email may determine a frequency that the key phrase appears in the body of the email. Other rules may determine how frequently the key phrase appears in such content associated with a group, department, division, or subset of the organization to which the user belongs. Yet other rules may determine how frequently the key phrase appears in such content across the entire organization. A technical benefit of using key phrases extracted from content associated with the user and ranking those key phrases according to their predicted relevance to the user provides more personalized and more relevant topic recommendations for the user. These techniques may provide more personalized and relevant topic recommendations in instances where the user under-specifies the query for topics, such as where the user provides no query parameters to limit the query for topics or only provides a very limited number of characters. The user does not need to manually filter through the vast number of topics that may be associated with the user's organization in order to identify tags that are relevant. Thus, this approach may save both user time and effort, and may reduce the computing resources required for identifying relevant topics.

The ranked key phrase information output by the rule-based ranking unit 330 may be provided to a whitelist matching unit 335. The whitelist matching unit 335 may be configured to use one or more whitelists and/or guard lists to filter out key phrases that may be potentially inappropriate or offensive. A whitelist may include a list of key phrases that are expressly permitted to be included in the user-centric topic recommendations. A guard list may include a list of key phrases that are prohibited from being included in the user-centric topic recommendations. The whitelists and/or guard lists may be maintained by a group of administrators that monitor language usage conventions and update the lists accordingly. Language usage changes over time, and certain key phrases may become offensive or inappropriate. The topic suggestion service 110 may provide an interface that allows a user to provide feedback that a particular topic suggestion is inappropriate. The key phrase may be removed from the whitelist and/or added to a guard list associated with the user. The whitelist and/or guard list used for multiple users may also be updated if a threshold number of users report a topic suggestion as being inappropriate.

In the example shown in FIG. 3, the whitelist matching unit 335 is configured to use one or more static whitelists 340 and/or one or more dynamic whitelists 345. However, in other implementations, the whitelist matching unit 335 may utilize one or more static and/or one or more dynamic guard lists in addition to or instead of the one or more static whitelists 340 and/or one or more dynamic whitelists 345. A static whitelist or static guard list may include a predetermined set of key phrases that is not updated dynamically. A dynamic whitelist or dynamic guard list may be updated in response to an administrator updating the list and/or based on user feedback. The changes to a dynamic list may be made in substantially real time. The whitelist matching unit 335 may output key phrase information for the key phrases permitted by the whitelist and/or guard lists utilized by the whitelist matching unit 335.

The output from the whitelist matching unit 335 may be provided to a topic classifier unit 350 which may be configured to identify a topic or topics associated with the key phrases and to determine whether the topic or topics are present in the organization-wide knowledge base 220. The topic classifier unit 350 may be configured to analyze the key phrase information output by the whitelist matching unit 335. The topic classifier unit 350 may analyze the key phrase information using a machine learning model configured to analyze a textual input and to output a predicted category for the textual input. The category associated with each key phrase may be utilized as a topic. The output from the topic classifier unit 350 may include a list of topics identified in the key phrase information analyzed by the topic classifier unit 350. The topic classifier unit 350 may compare the topic or topics identified in the key phrases with the topics included in the organization-wide knowledge base 220 to determine that the topic is one that found in the organization-wide knowledge base 220. The topic classifier unit 350 may discard topics not found in the organization-wide knowledge based 220 to ensure that the user-centric topics are topics that are used within the organization. An advantage of this approach is that the user will be presented with topics that are relevant both to the user and to organization for which the user is using the topics to tag content items. Consequently, the tags should be useful to other users associated with the organization for identifying content relevant to those users.

The output from the topic classifier unit 350 may be provided to a user-centric classifier unit 355. The user-centric classifier unit 355 may analyze the topic or topics obtained from the topic classifier unit 350 using one or more machine learning models and/or rules-based models configured to analyze a textual input of a topic to determine whether the topic is a user-centric topic. The user-centric classifier unit 355 may determine that a particular topic included in the organization-wide knowledge base 220 is also a user-centric topic based on how frequently the topic is used in the content created by or otherwise associated with the user. The user-centric classifier unit 355 may analyze the content items using thresholds specific to certain types of content for determining whether a particular is a user-centric topic. For example, the user-centric classifier unit 355 may use a first threshold for determining whether a particular topic is a user-centric topic by determining that the topic appears in a threshold number of times in email messages and/or chat messages which the user drafted. The user-centric classifier unit 335 may use a second threshold for determining whether a particular topic is a user-centric topic 335 based on how many documents authored by the user in which a particular topic appears. Other thresholds may be used in addition to or instead of the example thresholds described herein. The user-centric classifier unit 335 may determine that a particular topic is a user-centric topic in response to the frequency of the topic satisfying one or more of the thresholds.

The user-centric topics output from the user centric topic classifier unit 355 may be stored in the user-centric topic suggestion datastore 215. The topic suggestions associated with each user may be stored in a user shard or partition of the user-centric topic suggestion datastore 215. The output from the topic classifier unit 350 may be used to update topic suggestion information associated with a group or organization with which the user is associated. The data may be stored in a format that may be queried by the suggestion request processing unit 205 to obtain suggestion requests for a user. Furthermore, the rankings determined by the rule-based ranking unit 330 may be stored with each of the entries added to the user-centric topic suggestion datastore 215.

Figure 4:
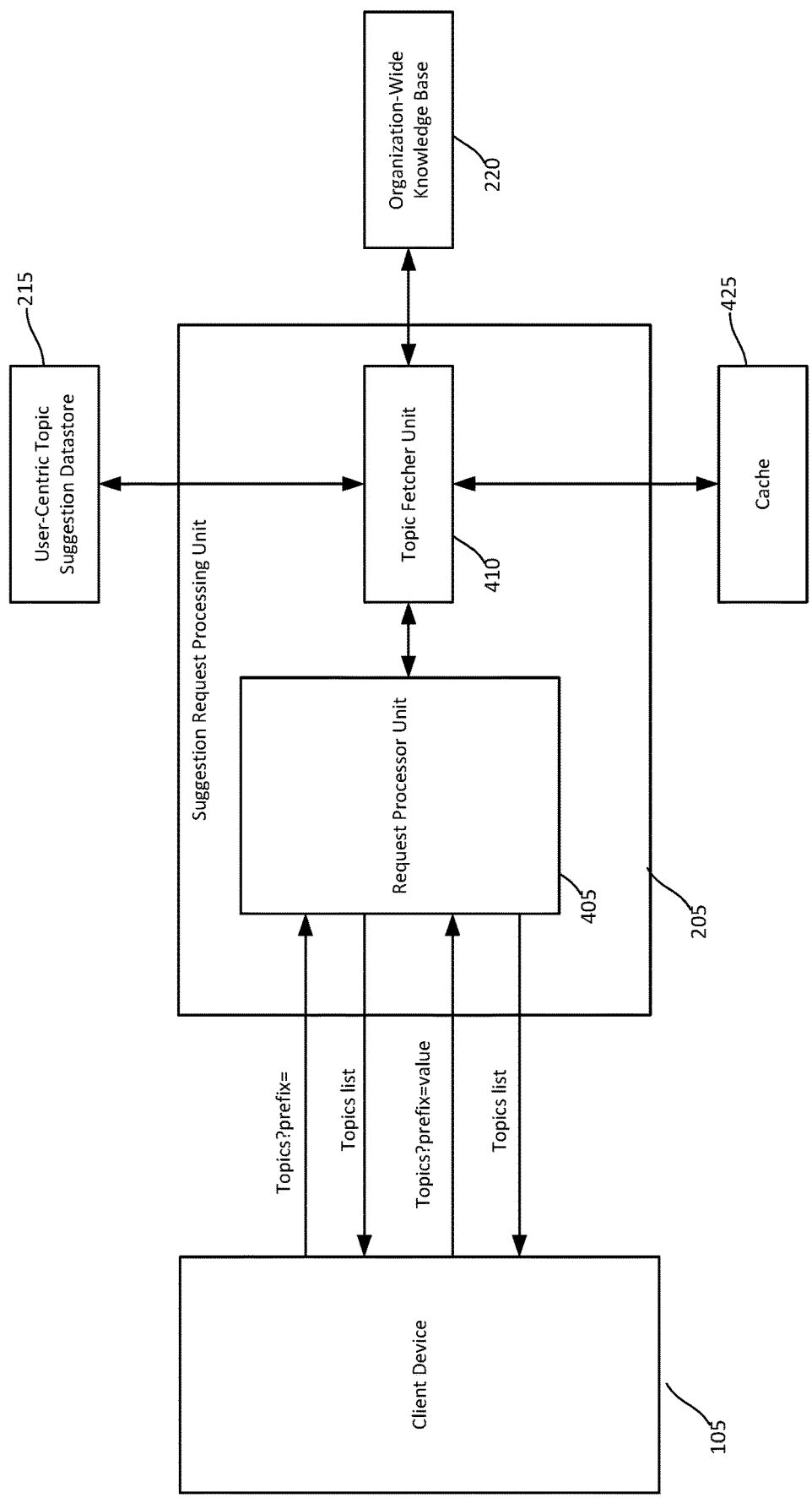
FIG. 4 is a diagram showing additional details of the suggestion request processing unit of the topic suggestion service shown in FIG. 2.

FIG. 4 is a diagram showing additional details of the suggestion request processing unit 205 of the topic suggestion service 110 shown in FIG. 2. The suggestion request processing unit 205 may include a request processor unit 405 and a topic fetcher unit 410. The request processor unit 405 is configured to receive requests for a topic suggestion from a requestor. The requestor may be a client device 105 and/or an application service 125. The request processor unit 405 may initially receive a "zero-term" query in which no query parameters have yet been provided by the user. A zero-term query may be issued by the requestor in response to the user initiating a request for topic suggestion but before the user has entered any query parameters. The request may specify a number of topic suggestions to being requested. The request processor unit 405 may cause the topic fetcher unit 410 to obtain the requested number of topic selections several sources including a cache 425, the user-centric topic datastore 215, and/or the organization-wide knowledge base 220. For a zero-term query, the topic fetcher unit 410 attempts to obtain the requested number of topic recommendations from the cache 425 and/or the user-centric topic datastore 215 based on the rank associated with the entries. If the cache 425 and/or the user-centric topic datastore 215 contains the requested number of topic suggestions, the request processor unit 405 may provide the requestor with a topics list including a list of user-centric topics obtained from the cache 425 and/or the user-centric topic datastore 215. Otherwise, if the number of user-centric topics available in the cache 425 and/or the user-centric topic datastore 215 are less than the number requested by the requestor, additional topic recommendations may be obtained from the organization-wide knowledge base 220 as discussed below.

The cache 425 may be used to store user-centric topic recommendations and to facilitate rapid retrieval of the user-centric topic recommendations. The cache 425 may be populated with user-centric topic recommendations obtained from the user-centric topic datastore 215. The cache 425 may be used to store the results of a query for user-centric topic information from the user-centric topic datastore for a predetermined amount of time to facilitate rapid retrieval of the topic recommendations without having to rerun the query on the user-centric topic datastore 215. When populating the cache 425 with the user-centric topic recommendations, the topic fetcher unit 410 may be configured to compare the topic obtained from the user-centric topic datastore 215 with topics included in the organization-wide knowledge base 220. As discussed in the preceding examples, the user-centric topic determination unit 210 may compare the user-centric topic recommendations determined by the user-centric topic determination unit 210 are included in the organization-wide knowledge base 220 before adding the topics to the user-centric topic datastore 215 for the user. The topic fetcher unit 410 may also be configured to determine whether the user-centric topics obtained from the user-centric topic datastore 215 are found in the organization-wide knowledge base 220. The topic fetcher unit 410 may exclude those user-centric topics not found in the organization-wide knowledge base 220 from recommendations presented to the user and/or from the cache 425. The topic fetcher unit 410 may perform this check to identify topics that may have been found in the organization-wide knowledge base 220 at the time that the user-centric topics were added to the user-centric topic datastore 215 but are no longer available in the organization-wide knowledge base 220 for whatever reason. A technical benefit of this approach is that it ensures that the user is not presented with invalid user-centric topic recommendations that is not used by the organization with which the user is associated.

For zero-term queries, the topic fetcher unit 410 may obtain user-centric topics from the cache 425, if the cache has been populated with user-centric topic data associated with that user. The cache 425 may be configured to mark the cache entries as expired responsive to a predetermined period of time elapsing since the cache entry was created. If the cache 425 contains the requested number of topic suggestions for a specific query, the request processor unit 405 may provide the requestor with a topics list including a list of user-centric topics obtained from the cache 425. Otherwise, the topic fetcher unit 410 may attempt to obtain user-centric topic recommendations from the user-centric topic datastore 215. If the cache 425 and/or the user-centric topic datastore 215 did not include any entries for the user or the number of results obtained is less than those requested by the requestor, the topic fetcher unit 410 may attempt to obtain additional topic suggestions from the organization-wide knowledge base 220. The organization-wide knowledge base 220 may include topic information for division, group, or organization with which the user is associated. These topics may be less relevant to the user but may be provided to the user in response to there not being enough user-centric topics available to satisfy the request.

The cache 425 may be updated each time that the topic fetcher unit 410 obtains topic suggestions from the user-centric topic datastore 215 and/or the organization-wide knowledge base 220. Each cache entry may associate a user identifier and a set of query parameters with the cached query results, so that the topic fetcher unit 410 may obtain the cached query results for subsequent queries from the same user for the same parameters. The topic fetcher unit 410 provides the user-centric topics (if any) obtained from the cache 425 and/or the user-centric topic datastore 215 and any organization-wide topic recommendations (if any) to the request processor unit 405.

The request processor unit 405 may receive a subsequent request from the requestor that includes a query parameter for selecting user-centric topics. The query parameter may be a prefix comprising one or more letters. The prefix represents first one or more characters of a topic for which the user is searching. The user may enter these characters into a user interface on the client device 105. Examples of how the user may search for topics are shown in FIGS. 5A-5E and 6A-6D. The topic fetcher unit 410 attempts to obtain topic suggestions from the cache 425, the user-centric topic datastore 215, and the organization-wide knowledge base 220 in the similar manner as for zero-term queries but instead selects topics that starts with the letters included in the query parameter. Any user-centric topics are included at the beginning of the topics list. The user-centric topics are likely to be more relevant to the user and are presented before any more general topic recommendations obtained from the organization-wide knowledge base 220 are presented to the user.

FIGS. 5A, 5B, 5C, 5D, and 5E show an example graphical user interface 505. The user interface 505 is a project planning application and demonstrates how current systems would suggest topics to a user. The application may be part of a suite of applications that are available to users within an organization. The application includes a means for users that are part of a project planning group to post message to other members of the project planning group. The user may also provide one or more tags to be associated with the messages. These tags may facilitate searching for relevant content and/or other features based on the tags associated with the messages. While the example user interface 505 shown in FIGS. 5A-5E may be used to associate tags with messages, other implementations may be used to associate tags with other types of content.

Figure 5C:
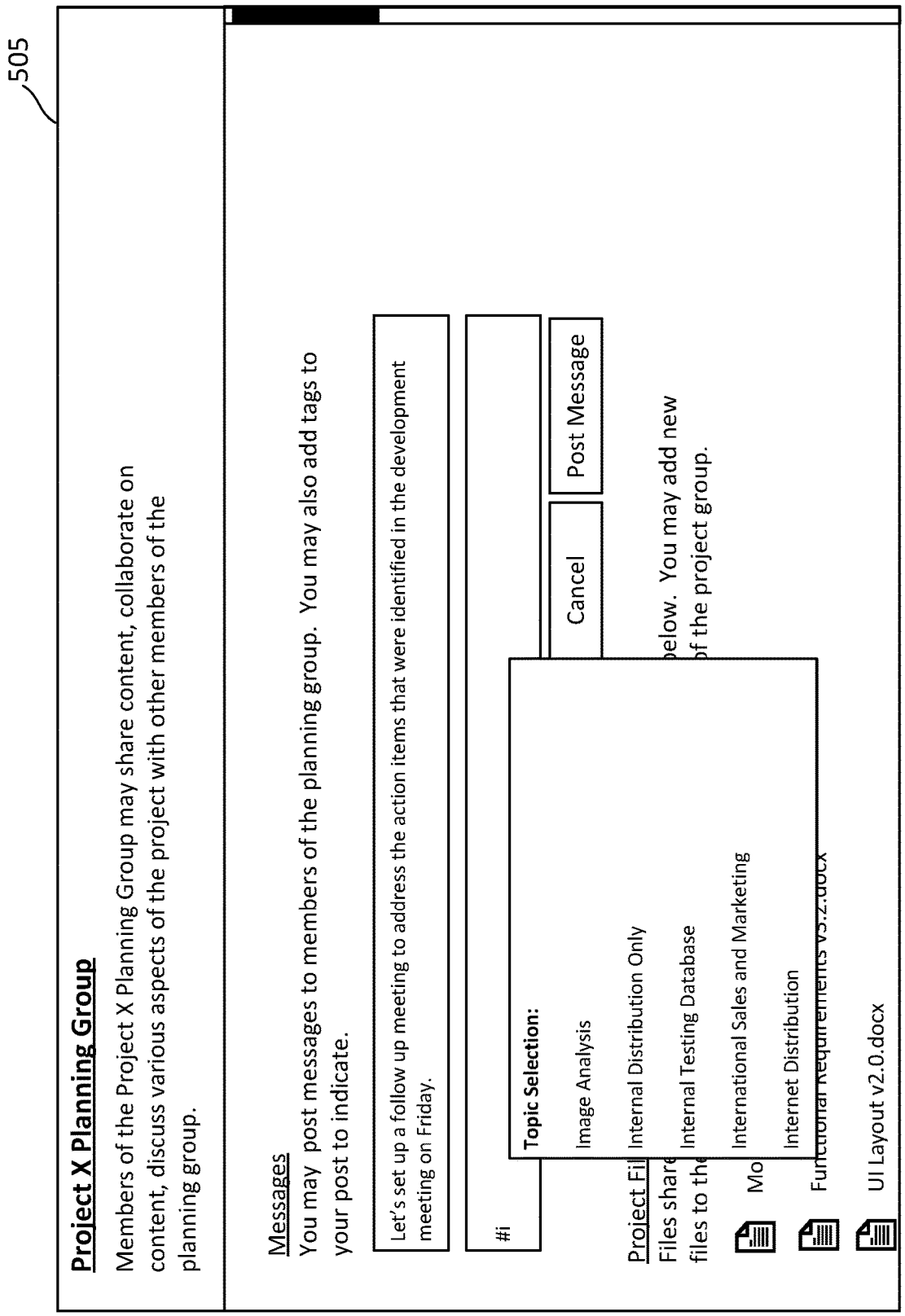
Figure 5D:
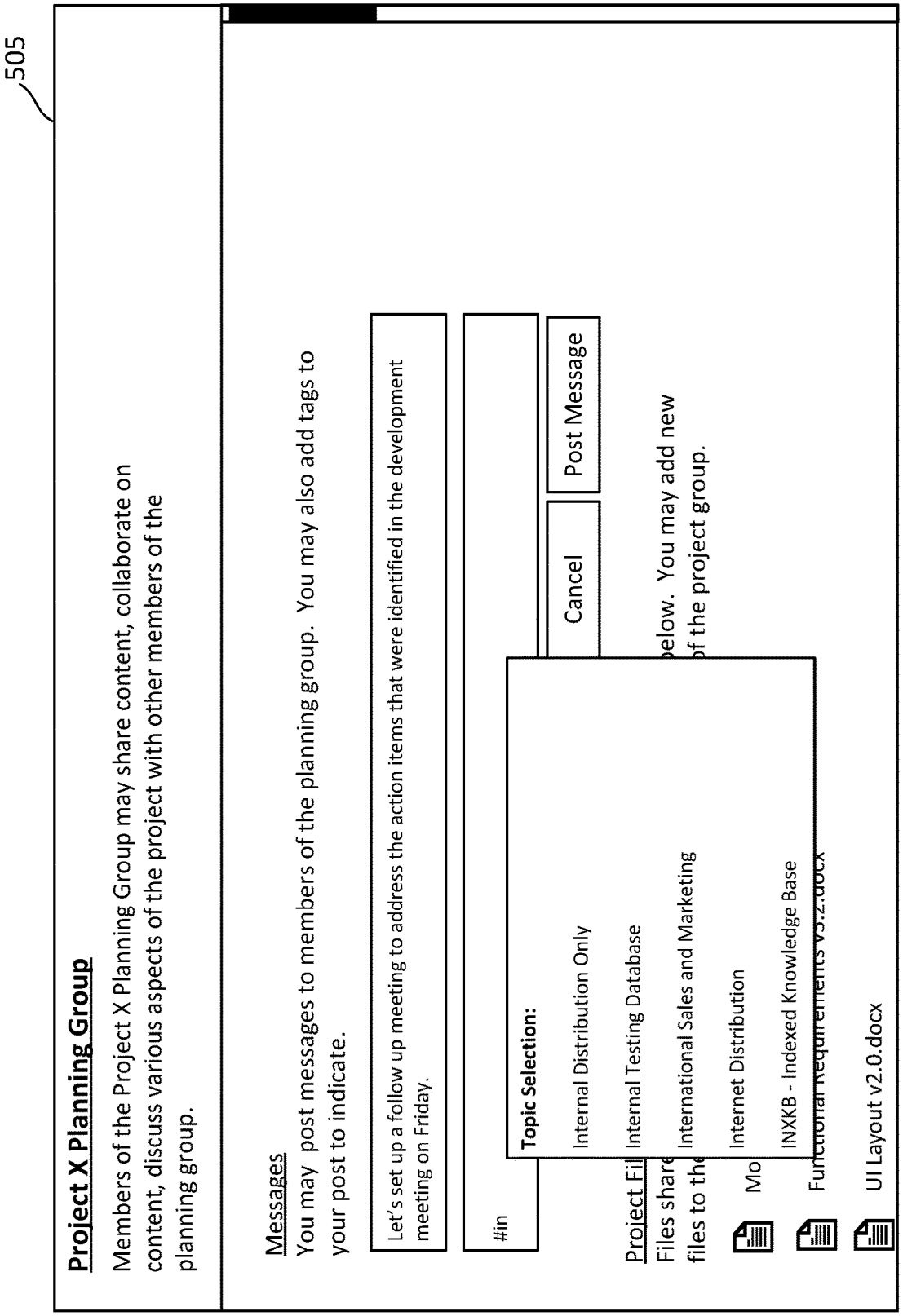
Figure 5E:
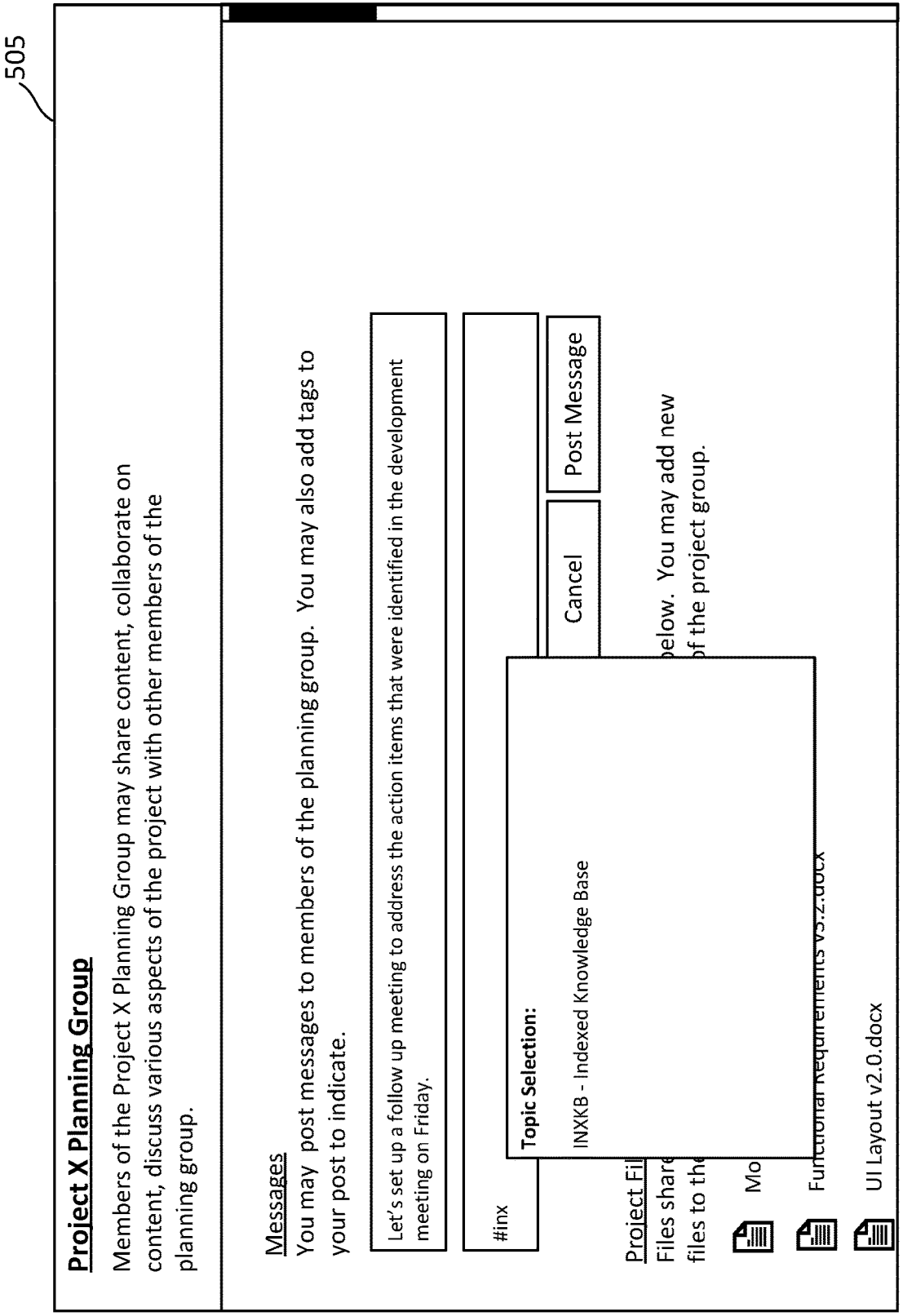

FIG. 5A shows an initial state in which the user has not yet provided an indication that the user will be entering a tag to associate with the message that has been entered. FIG. 5B shows a second state in which the user has entered a hashtag ("#") to indicate that the user intends to add a tag to the message. The user is presented with a set of topics that are selected from among the topics associated with the organization associated with the user. These recommendations may be selected from a large number of topics associated with the organization that are often not relevant to the user. The recommended topics are shown in alphabetical order in this example. FIGS. 5C, 5D, and 5E show examples of the list of recommended topics being dynamically updated as the user enters additional characters in the prefix for the tag. In FIG. 5E, only one tag matches the text input by the user. The user may select the tag to be associated with the message or cancel the process of adding the tag to the message.

Figure 6B:
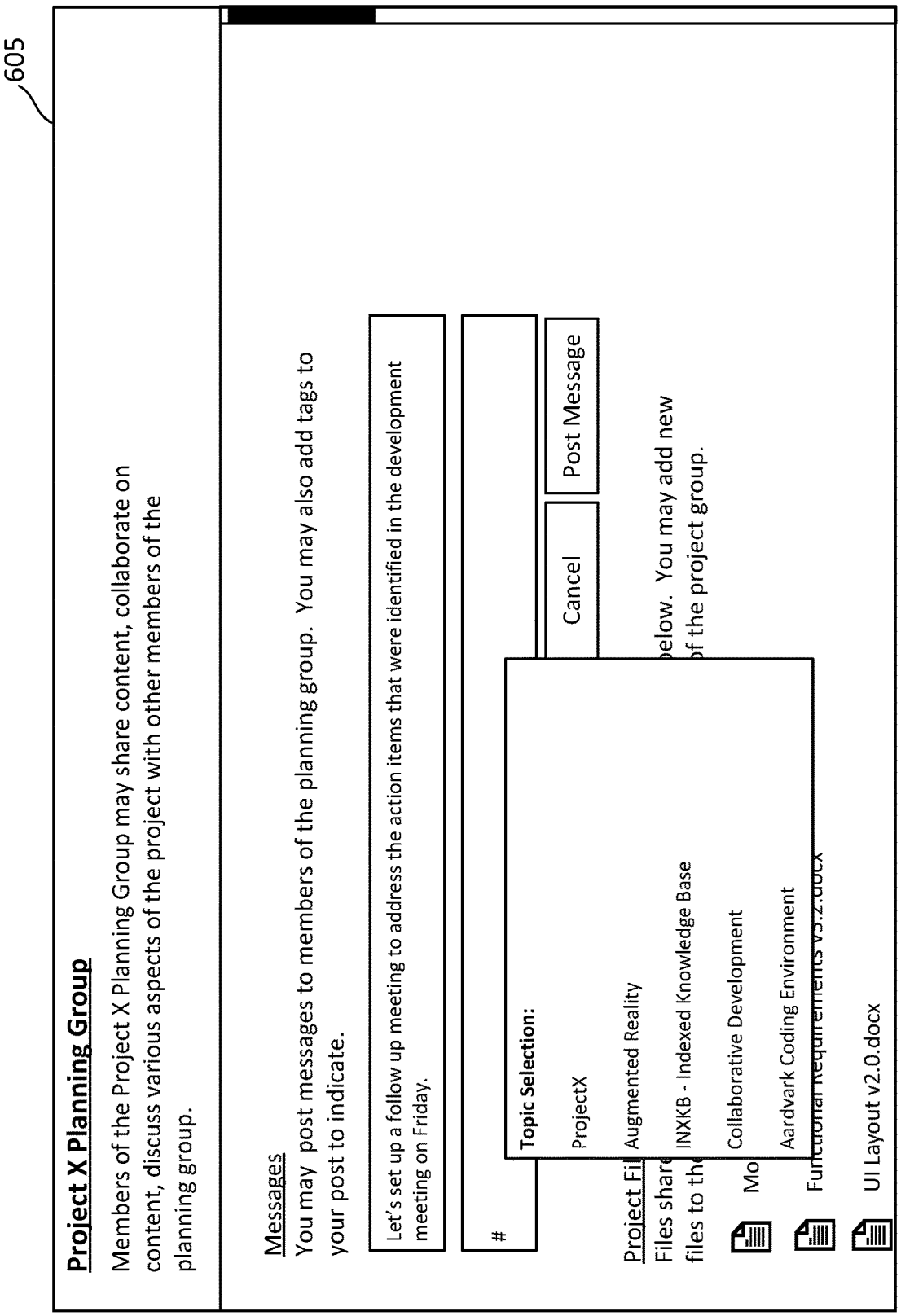
Figure 6C:
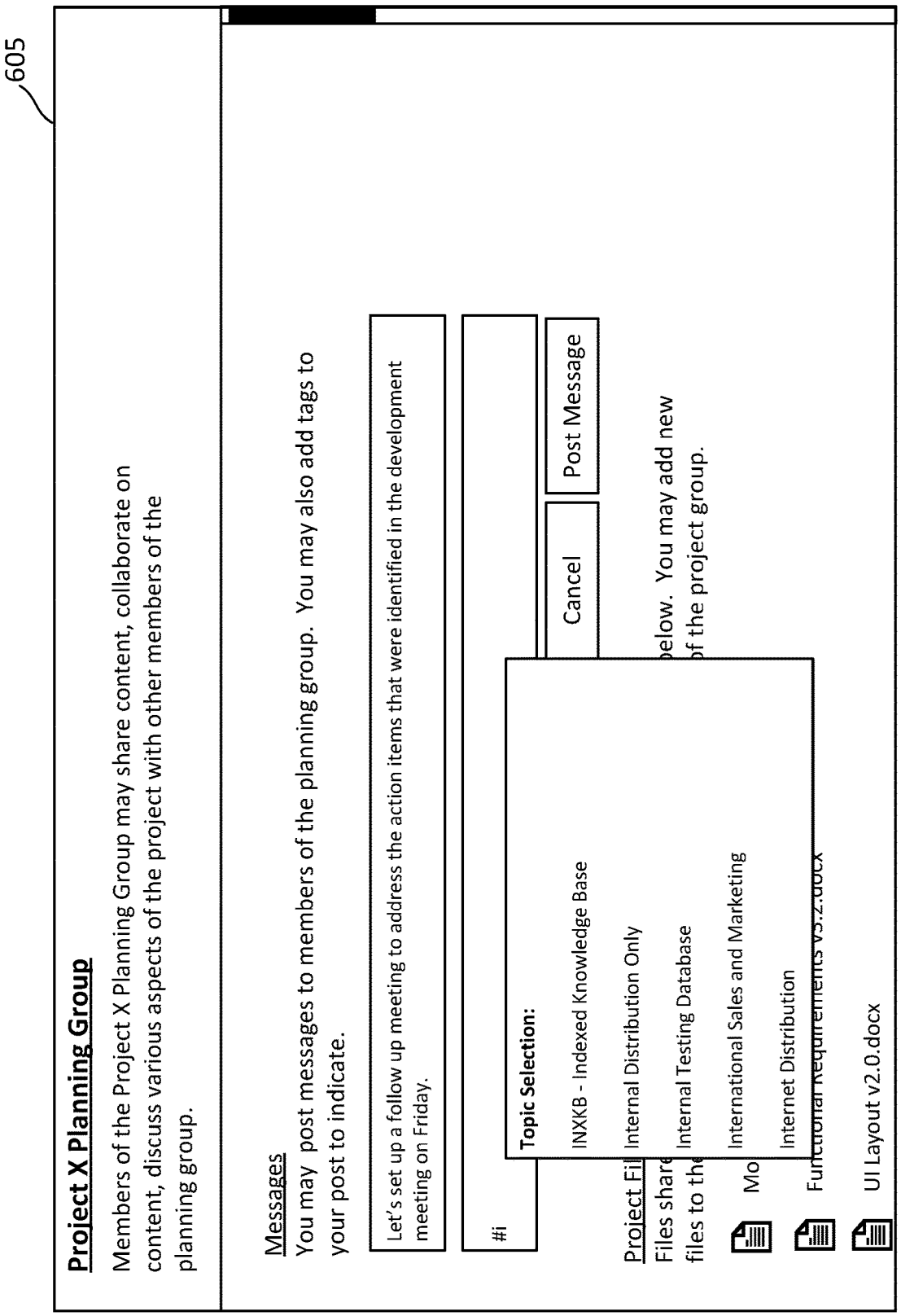
Figure 6D:
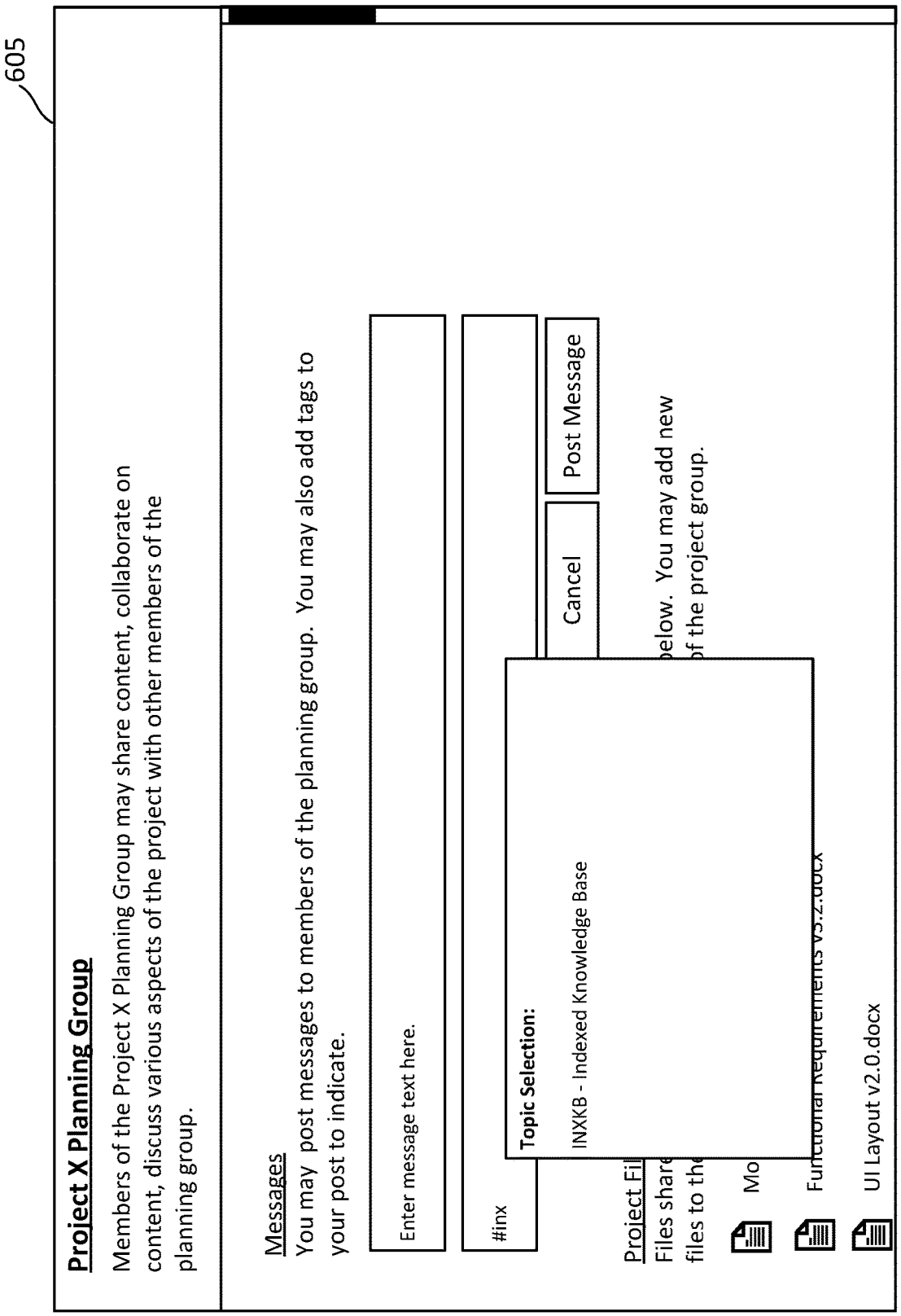

FIGS. 6A, 6B, 6C, and 6D show an example graphical user interface 605 which is similar to the user interface 505. However, the example shown in FIGS. 6A-6D implements the techniques for obtaining user centric recommendations provided herein. FIG. 6A shows an initial state in which the user has not yet provided an indication that the user will be entering a tag to associate with the message that has been entered. FIG. 6B shows a second state in which the user has entered a hashtag ("#") to indicate that the user intends to add a tag to the message. In this example, the user is provided with a set of user-centric recommendations that include four user-centric topic recommendations followed by a general recommendation obtained from the organization-wide knowledge base 220. The user-centric recommendations were obtained from the user-centric topic datastore 215.

Figure 7:
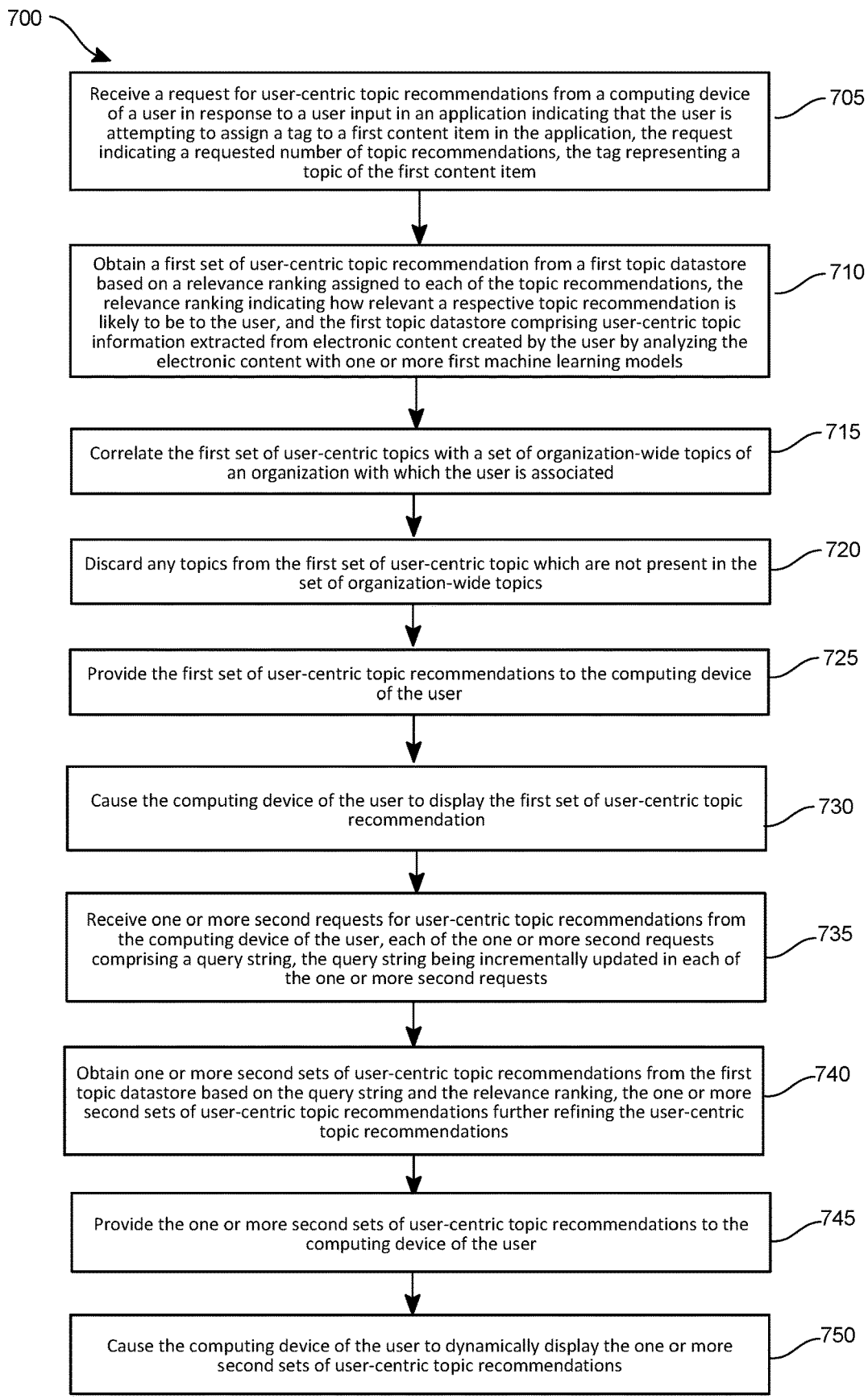
FIG. 7 is a flow chart of an example process for providing user-centric topic recommendations.

FIG. 7 is a flow chart of an example process 700 for providing user-centric topic recommendations. The process 700 may be implemented by the topic suggestion service 110 shown in the preceding examples.

The process 700 may include an operation 705 of receiving a request for user-centric topic recommendations from a computing device of a user in response to a user input in an application indicating that the user is attempting to assign a tag to a first content item in the application. The request indicates a requested number of topic recommendations, the tag representing a topic of the first content item. As discussed in the preceding examples, an application may provide a user interface that allows a user to enter a tag or tags to be associated with an electronic content item. Each tag represents a topic that may be associated with the electronic content item. The user may enter a hashtag or other indication that the user intends to create a new tag in an application, such as application provided by the application services 125a and 125b. The hashtag or other indication may cause the application to send a request to the topic suggestion service 110 for user-centric topic recommendations.

The process 700 may include an operation 710 of obtaining a first set of user-centric topic recommendations from a first topic datastore based on a relevance ranking assigned to each of the topic recommendations. The relevance ranking indicates how relevant a respective topic recommendation is likely to be to the user, and the first topic datastore includes user-centric topic information extracted from electronic content created by the user by analyzing the electronic content with one or more first machine learning models.

The process 700 may include an operation 715 of correlating the first set of user-centric topics with a set of organization-wide topics of an organization with which the user is associated and an operation 720 of discarding any topics from the first set of user-centric topic which are not present in the set of organization-wide topics. As discussed in the preceding examples, the user-centric topic suggestions may be compared with the topics included in the organization-wide knowledge base 220. The user-centric topics may be correlated with an organization-wide set of topics to provide topic recommendations that are not only relevant to the user but also to an organization with which the user is associated. These recommended topics may be used to tag documents, email messages, and/or other content used by users of the organization, which may facilitate searching for content items associated with the organization and/or recommending content items to users of the organization for whom the content items may be relevant.

The process 700 may include an operation 725 of providing the first set of user-centric topic recommendations to the computing device of the user, and the process 700 may include an operation 730 of causing the computing device of the user to display the first set of user-centric topic recommendations. Example of the of a first set of topic recommendations being presented to a user is shown in FIG. 6B.

The process 700 may include an operation 735 of receiving one or more second requests for user-centric topic recommendations from the computing device of the user. Each of the one or more second requests comprising a query string, the query string being incrementally updated in each of the one or more second requests. The user may type in a prefix string (also referred to herein as a query string) to further narrow the list of topic recommendations that are presented to the user.

The process 700 may include an operation 740 of obtaining one or more second sets of user-centric topic recommendations from the first topic datastore based on the query string and the relevance ranking, the one or more second sets of user-centric topic recommendations further refining the user-centric topic recommendations. As discussed in the preceding examples the suggestion request processing unit 205 of the topic suggestion service 110 may dynamically update the user-centric topic recommendations as the user types a query string. An example of such dynamic updates are shown in FIGS. 6A-6D.

The process 700 may include an operation 745 of providing the one or more second sets of user-centric topic recommendations to the computing device of the user. The topic suggestion service 110 may send the updated sets of user-centric topic recommendations to the client device 105 of the user as discussed with respect to FIGS. 6A-6D.

The process 700 may include an operation 750 of causing the computing device of the user to dynamically display the one or more second sets of user-centric topic recommendations. Examples of are user interface of the client device 105 being dynamically update are shown in FIGS. 6A-6D. The user may select one of one of the topics recommended to the user and that topic may be added as a tag to an electronic content item. The tag may be used to facilitate searching and identification of content items that may be relevant to the user and/or other users.

The detailed examples of systems, devices, and techniques described in connection with FIGS. 1-7 are presented herein for illustration of the disclosure and its benefits. Such examples of use should not be construed as limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
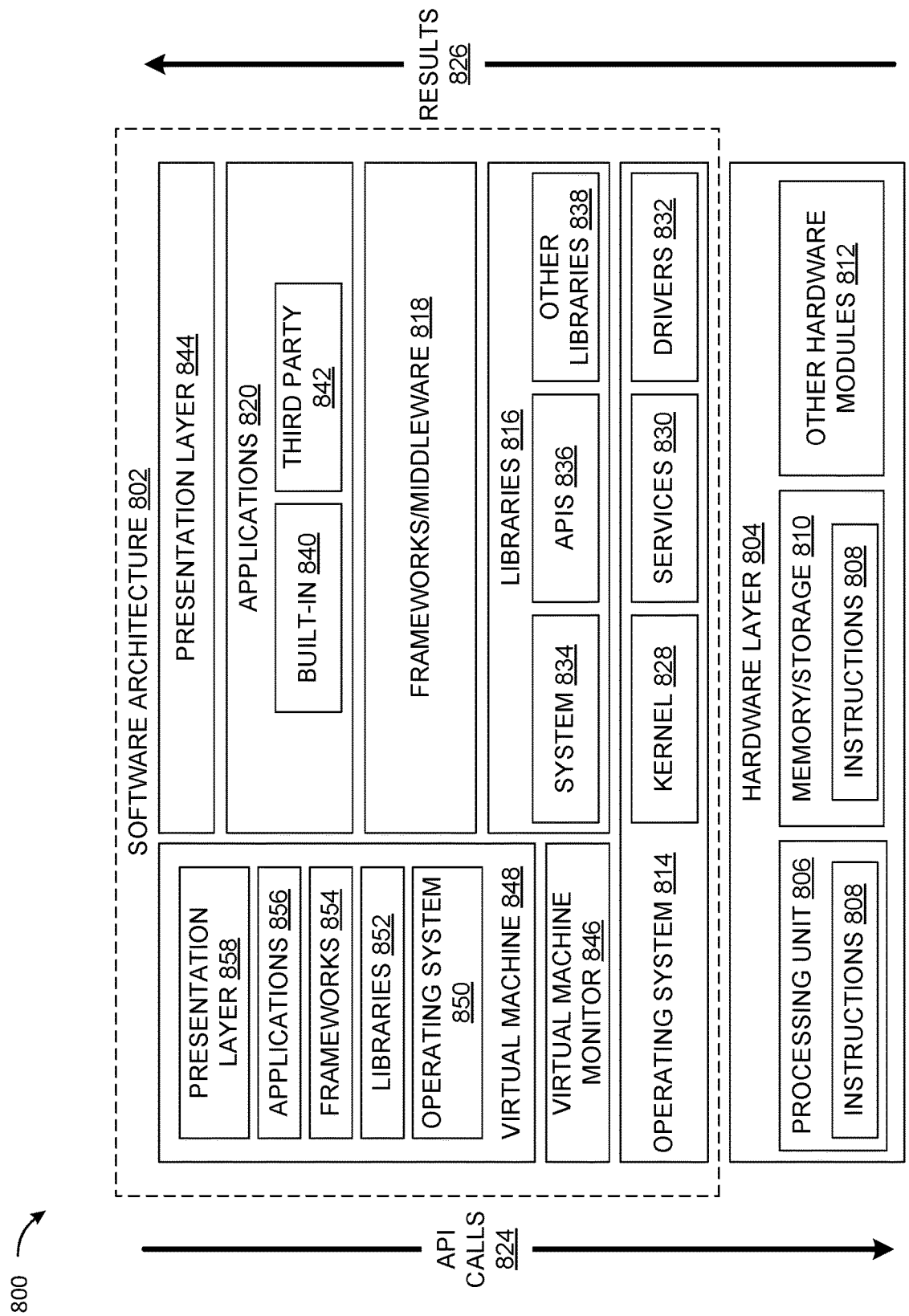
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs 836 for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
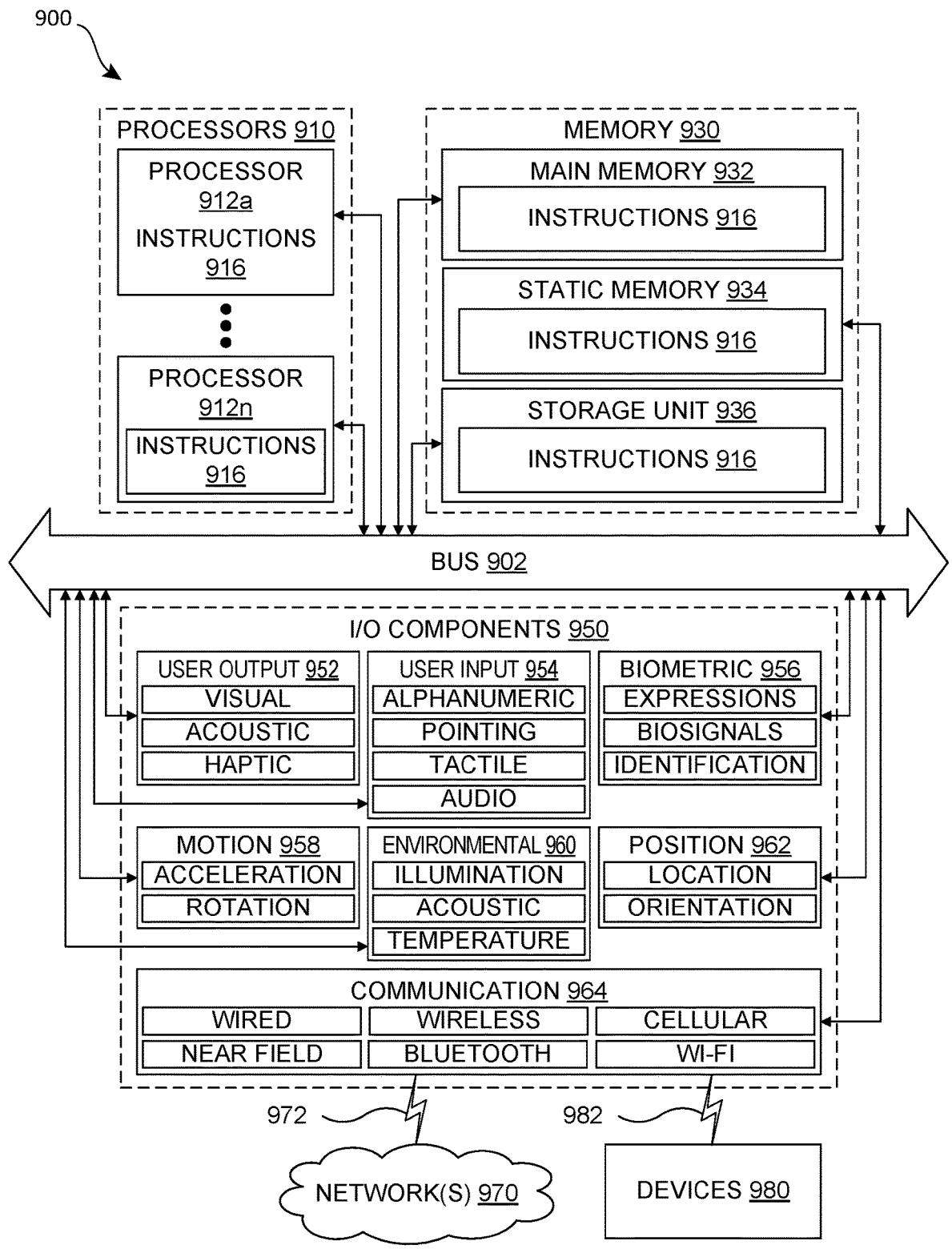
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:
1. A data processing system comprising:
a processor; and
a machine-readable medium storing executable instructions that, when executed, cause the processor to perform operations comprising:

receiving a request for user-centric topic recommendations from a computing device of a user in response to a user input in an application indicating that the user is attempting to assign a tag to a first content item in the application, the request indicating a requested number of topic recommendations, the tag representing a topic of the first content item;

obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models;

correlating the first set of user-centric topics with a set of organization-wide topics of an organization with which the user is associated;

discarding any topics from the first set of user-centric topic which are not present in the set of organization-wide topics;

providing the first set of user-centric topic recommendations to the computing device of the user;

causing the computing device of the user to display the first set of user-centric topic recommendations;

receiving one or more second requests for user-centric topic recommendations from the computing device of the user, each of the one or more second requests comprising a query string, the query string being incrementally updated in each of the one or more second requests;

obtaining one or more second sets of user-centric topic recommendations from the first topic datastore based on the query string and the relevance ranking, the one or more second sets of user-centric topic recommendations further refining the user-centric topic recommendations;

providing the one or more second sets of user-centric topic recommendations to the computing device of the user; and causing the computing device of the user to dynamically display the one or more second sets of user-centric topic recommendations.

2. The data processing system of claim 1, wherein the machine-readable medium further comprises instructions configured to cause the processor to perform operations:
determining that the first set of user-centric topic recommendations are available in a cache; and
obtaining the first set of user-centric topic recommendations from the cache rather than the first topic datastore.

3. The data processing system of claim 1, wherein the machine-readable medium further comprises instructions configured to cause the processor to perform operations:
after discarding any topics from the first set of user-centric topic which are not present in the set of organization-wide topics, adding the first set of user-centric topic recommendations and the one or more second sets of user-centric topic recommendations to a cache for faster retrieval in response to similar requests for user-centric topic recommendations.

4. The data processing system of claim 1, wherein the machine-readable medium further comprises instructions configured to cause the processor to perform operations:

determining that the first set of user-centric topic recommendations includes less than the requested number of topic recommendations;
obtaining additional topic recommendations from a second topic datastore comprising organization-wide topics associated with an organization with which the user is associated;
providing the additional topic recommendations to the computing device of the user; and
causing the computing device of the user to display the additional topic recommendations after the first set of user-centric topic recommendations.

5. The data processing system of claim 1, wherein the machine-readable medium further comprises instructions configured to cause the processor to perform operations:
obtaining a plurality of electronic content items created by the user;
providing the plurality of electronic content items as an input to the one or more first machine learning models, the one or more first machine learning models being configured to receive first textual content as an input, to extract key phrase information from the plurality of content items, and to output the key phrase information; and
analyzing the plurality of electronic content items using the one or more first machine learning models to obtain the key phrase information for the plurality of electronic content items.

6. The data processing system of claim 5, wherein the machine-readable medium further comprises instructions configured to cause the processor to perform operations:
providing the key phrase information as an input to one or more second machine learning models, the second machine learning models being configured to receive second textual input, to identify one or more topics included in the second textual input, and to output the one or more topics;
analyzing the key phrase information using the one or more second machine learning models to obtain the one or more topics included in the key phrase information; and
adding the one or more topics to the first topic datastore.

7. The data processing system of claim 6, wherein the machine-readable medium further comprises instructions configured to cause the processor to perform operations:
analyzing the key phrase information using one or more whitelists, one or more guard lists, or both prior to providing the key phrase information as an input to the one or more second machine learning models; and
removing one or more key phrases from the key phrase information that do not satisfy the one or more whitelists, the one or more guard lists, or both.

8. The data processing system of claim 6, wherein the machine-readable medium further comprises instructions configured to cause the processor to perform operations:
analyzing the key phrase information using one or more rules-based ranking models to obtain ranking information for the key phrase information prior to providing the key phrase information as an input to the one or more second machine learning models, the ranking information indicating a relevance of each key phrase to the user; and
adding a ranking indication to the first topic datastore derived from the ranking information associated with the key phrase information.

9. A method implemented in a data processing system for providing user-centric topic recommendations, the method comprising:
- receive a request for the user-centric topic recommendations from a computing device of a user in response to a user input in an application indicating that the user is attempting to assign a tag to a first content item in the application, the request indicating a requested number of topic recommendations, the tag representing a topic of the first content item;
- obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models;
- correlating the first set of user-centric topics with a set of organization-wide topics of an organization with which the user is associated;
- discarding any topics from the first set of user-centric topic which are not present in the set of organization-wide topics;
- providing the first set of user-centric topic recommendations to the computing device of the user;
- causing the computing device of the user to display the first set of user-centric topic recommendations;
- receiving one or more second requests for user-centric topic recommendations from the computing device of the user, each of the one or more second requests comprising a query string, the query string being incrementally updated in each of the one or more second requests;
- obtaining one or more second sets of user-centric topic recommendations from the first topic datastore based on the query string and the relevance ranking, the one or more second sets of user-centric topic recommendations further refining the user-centric topic recommendations;
- providing the one or more second sets of user-centric topic recommendations to the computing device of the user; and
- causing the computing device of the user to dynamically display the one or more second sets of user-centric topic recommendations.

10. The method of claim 9, further comprising:
- determining that the first set of user-centric topic recommendations are available in a cache; and
- obtaining the first set of user-centric topic recommendations from the cache rather than the first topic datastore.

11. The method of claim 9, further comprising:
- after discarding any topics from the first set of user-centric topic which are not present in the set of organization-wide topics, adding the first set of user-centric topic recommendations and the one or more second sets of user-centric topic recommendations to a cache for faster retrieval in response to similar requests for user-centric topic recommendations.

12. The method of claim 9, further comprising:
- determining that the first set of user-centric topic recommendations includes less than the requested number of topic recommendations;
- obtaining additional topic recommendations from a second topic datastore comprising organization-wide topics associated with an organization with which the user is associated;
- providing the additional topic recommendations to the computing device of the user; and
- causing the computing device of the user to display the additional topic recommendations after the first set of user-centric topic recommendations.

13. The method of claim 9, further comprising:
- obtaining a plurality of electronic content items created by the user;
- providing the plurality of electronic content items as an input to the one or more first machine learning models, the one or more first machine learning models being configured to receive first textual content as an input, to extract key phrase information from the plurality of content items, and to output the key phrase information; and
- analyzing the plurality of electronic content items using the one or more first machine learning models to obtain the key phrase information for the plurality of electronic content items.

14. The method of claim 13, further comprising:
- providing the key phrase information as an input to one or more second machine learning models, the second machine learning models being configured to receive second textual input, to identify one or more topics included in the second textual input, and to output the one or more topics;
- analyzing the key phrase information using the one or more second machine learning models to obtain the one or more topics included in the key phrase information; and
- adding the one or more topics to the first topic datastore.

15. The method of claim 14, further comprising:
- analyzing the key phrase information using one or more whitelists, one or more guard lists, or both prior to providing the key phrase information as an input to the one or more second machine learning models; and
- removing one or more key phrases from the key phrase information that do not satisfy the one or more whitelists, the one or more guard lists, or both.

16. The method of claim 14, further comprising:
- analyzing the key phrase information using one or more rules-based ranking models to obtain ranking information for the key phrase information prior to providing the key phrase information as an input to the one or more second machine learning models, the ranking information indicating a relevance of each key phrase to the user; and
- adding a ranking indication to the first topic datastore derived from the ranking information associated with the key phrase information.

17. A machine-readable medium on which are stored instructions that, when executed, cause a processor of a programmable device to perform functions of:
- receiving a request for user-centric topic recommendations from a computing device of a user in response to a user input in an application indicating that the user is attempting to assign a tag to a first content item in the application, the request indicating a requested number of topic recommendations, the tag representing a topic of the first content item;
- obtaining a first set of user-centric topic recommendations from a first topic datastore based on a relevance ranking assigned to each of the topic recommendations, the relevance ranking indicating how relevant a respective topic recommendation is likely to be to the user, and the first topic datastore comprising user-centric topic information extracted from electronic content created by the user by analyzing the electronic content with one or more first machine learning models;

correlating the first set of user-centric topics with a set of organization-wide topics of an organization with which the user is associated;

discarding any topics from the first set of user-centric topic which are not present in the set of organization-wide topics;

providing the first set of user-centric topic recommendations to the computing device of the user;

causing the computing device of the user to display the first set of user-centric topic recommendations;

receiving one or more second requests for user-centric topic recommendations from the computing device of the user, each of the one or more second requests comprising a query string, the query string being incrementally updated in each of the one or more second requests;

obtaining one or more second sets of user-centric topic recommendations from the first topic datastore based on the query string and the relevance ranking, the one or more second sets of user-centric topic recommendations further refining the user-centric topic recommendations;

providing the one or more second sets of user-centric topic recommendations to the computing device of the user; and causing the computing device of the user to dynamically display the one or more second sets of user-centric topic recommendations.

18. The machine-readable medium of claim 17, further comprising instructions configured to cause the processor to perform operations:

adding the first set of user-centric topic recommendations and the one or more second sets of user-centric topic recommendations to a cache for faster retrieval in response to similar requests for user-centric topic recommendations.

19. The machine-readable medium of claim 17, further comprising instructions configured to cause the processor to perform operations:

determining that the first set of user-centric topic recommendations includes less than the requested number of topic recommendations;

obtaining additional topic recommendations from a second topic datastore comprising organization-wide topics associated with an organization with which the user is associated;

providing the additional topic recommendations to the computing device of the user; and causing the computing device of the user to display the additional topic recommendations after the first set of user-centric topic recommendations.

20. The machine-readable medium of claim 17, further comprising instructions configured to cause the processor to perform operations:

obtaining a plurality of electronic content items created by the user;

providing the plurality of electronic content items as an input to the one or more first machine learning models, the one or more first machine learning models being configured to receive first textual content as an input, to extract key phrase information from the plurality of content items, and to output the key phrase information; and analyzing the plurality of electronic content items using the one or more first machine learning models to obtain the key phrase information for the plurality of electronic content items.

* * * * *